March 16, 1937.  W. G. TOWER  2,073,911
MACHINE FOR MANUFACTURING BATTERY PLATE SEPARATORS
Filed Dec. 19, 1934  4 Sheets-Sheet 2
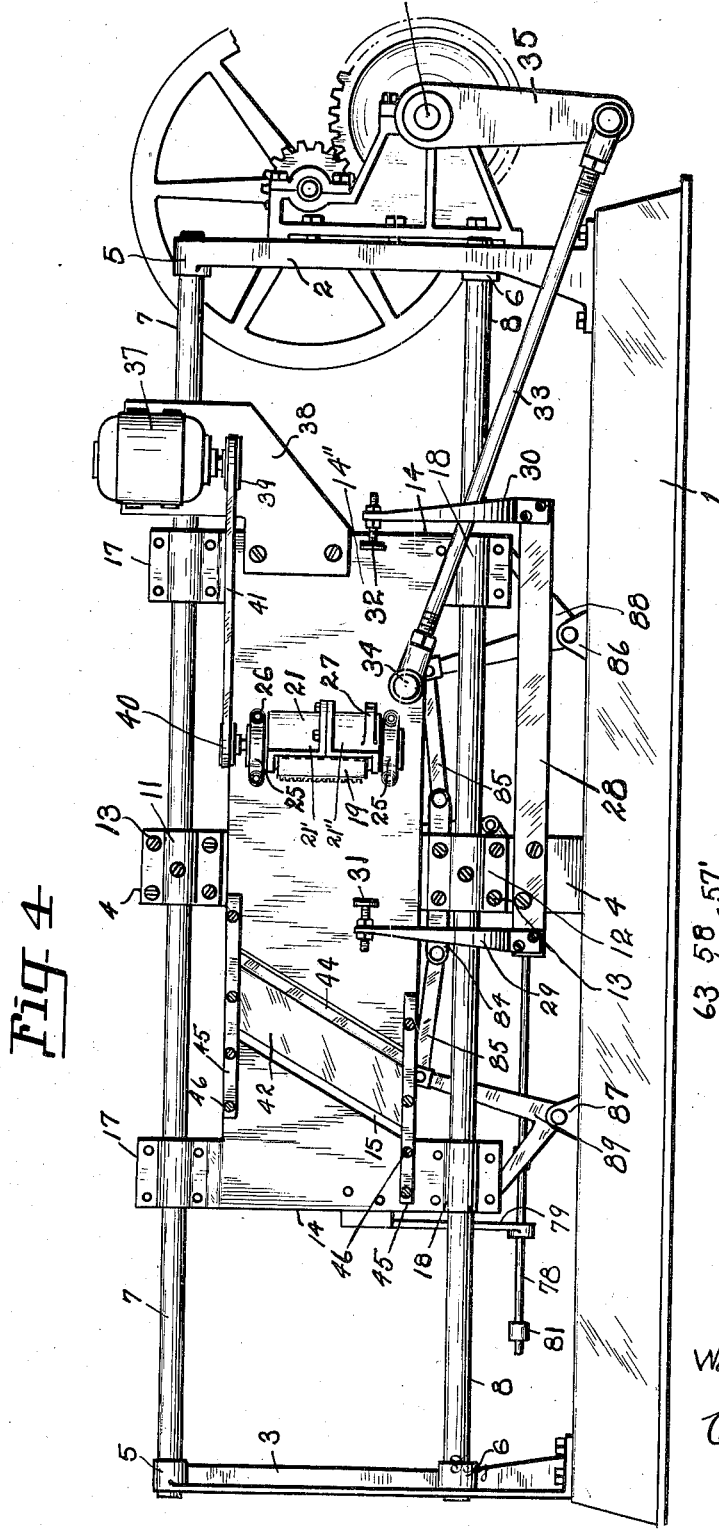
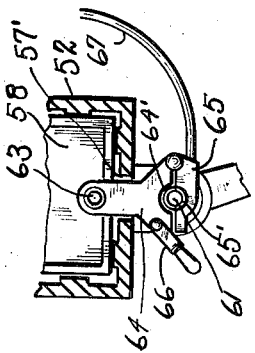
Inventor
Wallace G. Tower
Clive Hartson
Attorney

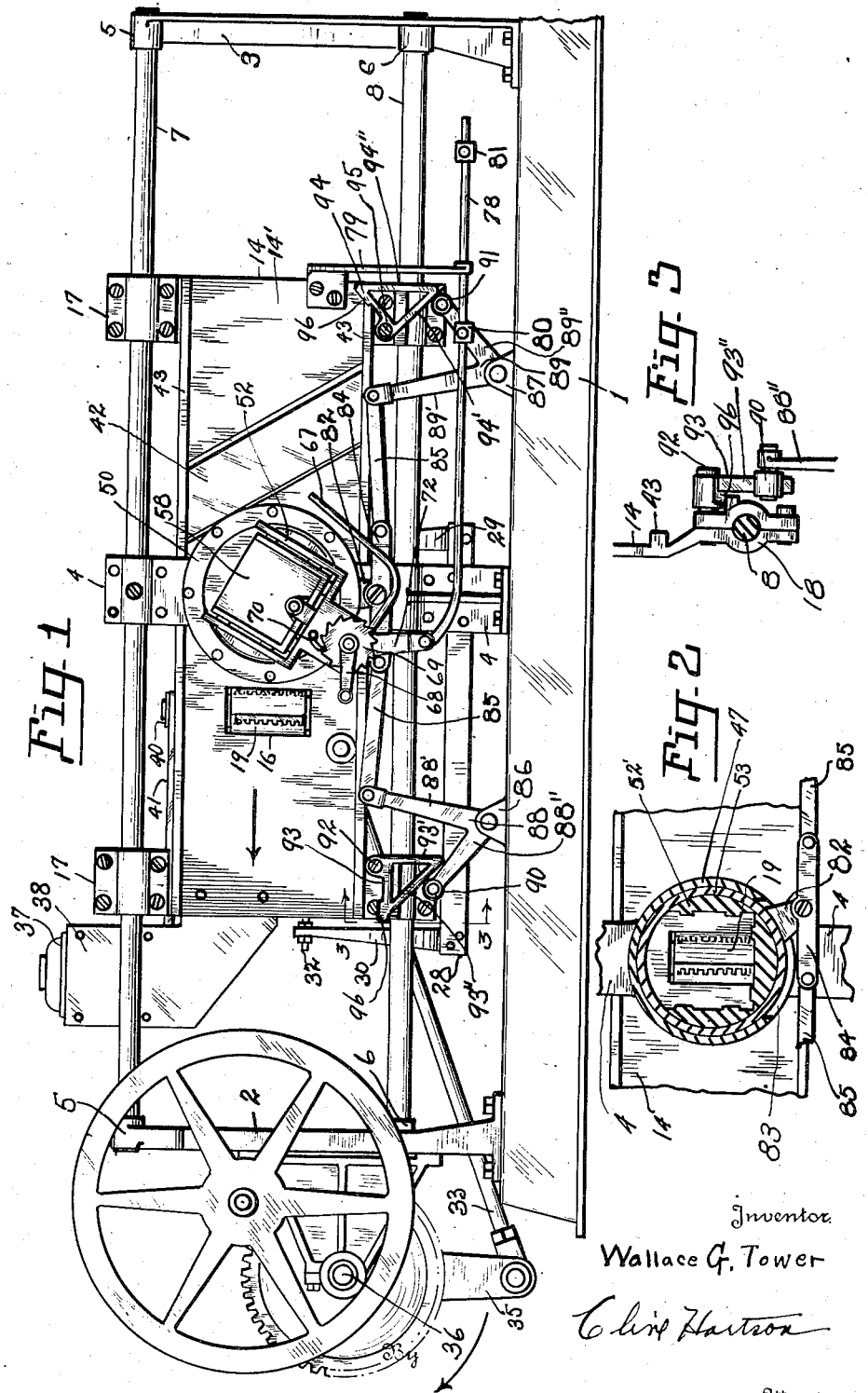

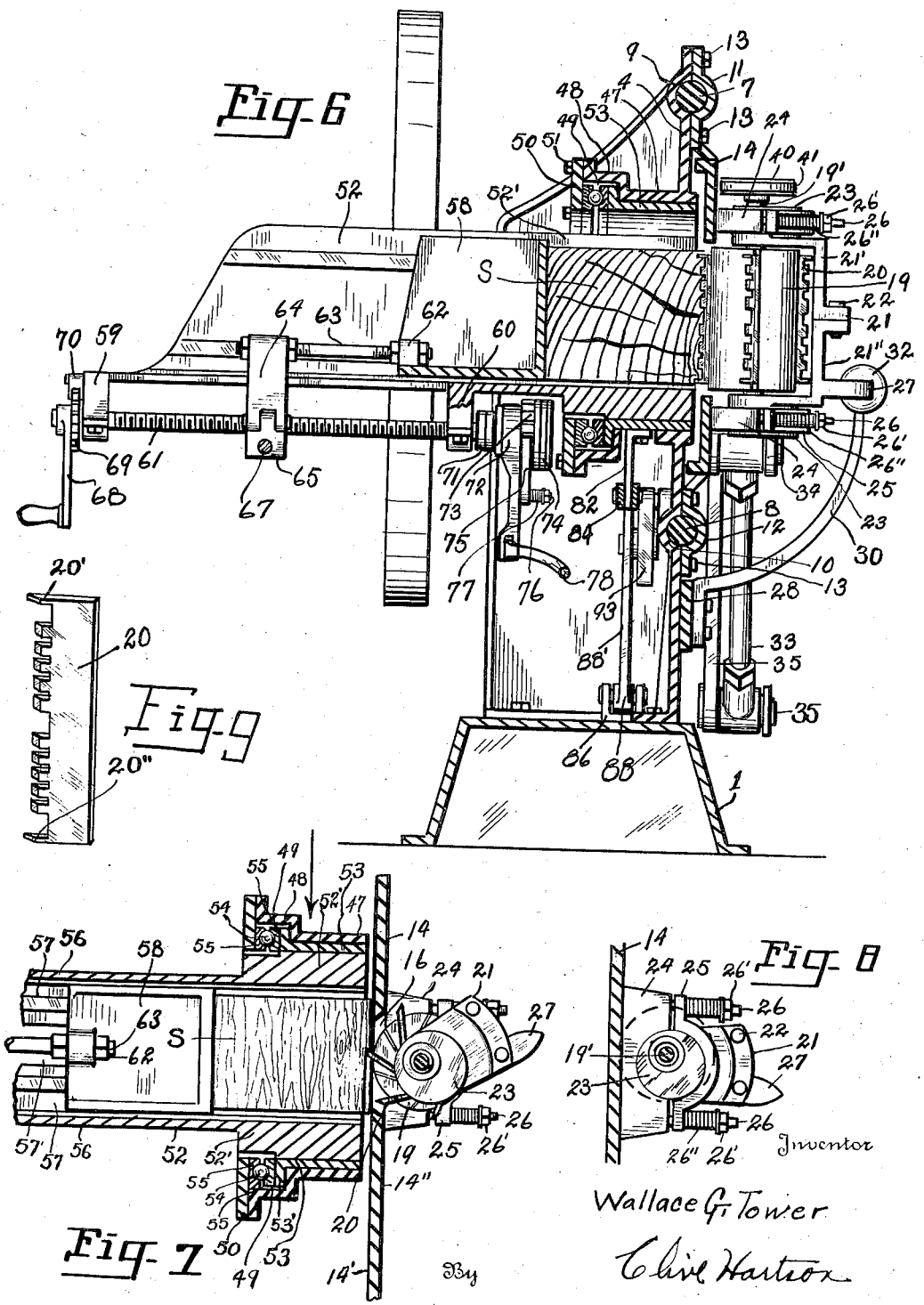

Inventor
Wallace G. Tower
Clive Hartson
By
Attorney

Patented Mar. 16, 1937

2,073,911

UNITED STATES PATENT OFFICE 2,073,911

MACHINE FOR MANUFACTURING BATTERY PLATE SEPARATORS

Wallace G. Tower, Milwaukie, Oreg.

Application December 19, 1934, Serial No. 758,283

11 Claims. (Cl. 144—42)

The present invention has to do with a machine for manufacturing separators employed in spacing plates of electric batteries. As is well known such separators are manufactured of various materials suitable for such purpose, among which materials or substances, wood occupies an important place. The present invention concerns itself particularly with the manufacture of such separators of wood.

The main object of this invention is to improve and simplify the manufacture of wooden separators. The improvement residing in the quality of completed separators and the simplification residing in the fact that one machine fashions such separators, while the practice heretofore has required the services of two or more machines in their manufacture.

Common practice requires that one face of a separator be supplied with grooves. Heretofore it has been the practice to saw or shear from a suitable piece of stock a strip having a thickness and width substantially that of a completed separator. Subsequently the strip was placed in a grooving machine and a number of grooves were cut in one face thereof, and thereafter the grooved strip was cut into lengths each equal to the length of a finished separator. In some instances the strip was subsequently planed or sanded. This comprises the operations, other than seasoning, usually followed in the manufacture of separators.

As will be seen, the last described practice required the services of at least two machines, a machine for shearing or sawing the strips, and a machine for grooving the strips after they have been sheared or sawn.

The object of this invention is to overcome the need for two machines. This has been done by providing a reciprocating carriage which carries means for grooving a face of a suitable block of stock, then shearing from such block a strip which will include the grooved face. The grooving and shearing is done as the carriage moves in one of its two directions of movement. Furthermore means are provided for supporting the block of stock during this operation which means turns the stock so that the grooving is performed along the grain of the stock or wood and the shearing is accomplished at a different angle to the grain. To avoid splitting the wood of which the separators are made it is necessary that the stock be attacked in the manner set forth.

After each separator has been sheared from the block or stock, the stock is automatically progressed to a position permitting another separator to be formed. This is repeated until the stock is consumed.

In the drawings:

Figure 1 is a front elevation of the invention.

Figure 2 is a horizontal sectional detail of the stock holding means.

Figure 3 is a detail partially in section of the tripping mechanism which operates or controls the turning of the stock holding means.

Figure 4 is a rear elevation of the invention in its entirety.

Figure 5 is a horizontal sectional detail of the mechanism for progressing or advancing stock in the stock supporting means.

Figure 6 is a side elevation, partially in section of the invention.

Figure 7 is a vertical sectional view of a portion of the stock supporting and advancing means, together with a plan of the grooving head supporting means.

Figure 8 is a plan of a grooving head and its supporting means.

Figure 9 is a perspective of a grooving knife.

Figure 11:
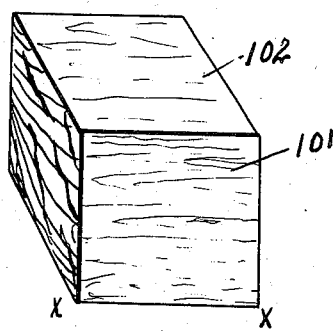
Figure 11 is a perspective of a wooden block of which separators are formed. This block throughout the description following is referred to as "stock".

In the drawings, Figures 1 and 4 show the invention in its entirety. It is here seen to embody a base 1. Proximate the ends of the base are uprights 2 and 3, which are arranged one at one end and one at the other end of such base. Situated between the two uprights is a third upright member 4, which with regard to the base and the other uprights, occupies an intermediate position. Uprights 2 and 3 are provided with upper and lower sockets 5 and 6 respectively. In sockets 5 are seated the ends of upper guide rod 7, while in sockets 6 are seated the ends of lower guide rod 8. These rods are arranged parallel to one another. Member 4 also serves as a support for rods 7 and 8, it being provided with arcuate portions or seats 9 and 10 to accommodate the rods which are cylindrical in cross section. Caps 11 and 12 cooperate respectively with the seats 9 and 10, securing the rods in their respective seats, bolts 13 being employed to secure the caps in place.

Members 7 and 8 function as a guideway supporting a member which is moved back and forth thereon. This member or carriage 14 is an elongated body having two cut out portions, one 15 in which a subsequently described shearing knife is maintained, and the other 16 through which a grooving device operates. Member 14 is carried on rods 7 and 8 by means of upper and lower guides 17 and 18 respectively. In operation the member 14 is moved back and forth, the guides 17 traveling on rod 7, and guides 18 traveling on rod 8.

In the operation of the present invention, stock for making separators is held in a suitable member opposite face 14' of member 14, which member is moved back and forth before such stock. As member 14 moves back and forth a grooving device carried by it cuts grooves in the exposed face of such stock, and a shearing knife slices or cuts a slice from the piece of stock. The dimensions of such piece is that of a completed separator. As member 14 moves back and forth separators are cut from the block of stock, a separator being removed from the stock each time member 14 moves in one of its two directions of movement.

Head 19 is cylindrical in form, rotates at high speed, and is provided with a number of slotted blades 20 projecting from its periphery. The cutting portions of knives 20, by reason of their slotted construction, cut grooves in the block where it is brought in contact with the head. The number 19' indicates either a shaft extending through the head or stub shafts projecting from each end thereof and referred to hereafter as shaft 19'. The head is mounted for rotation on this shaft. Head 19 is carried by its shaft in a cage 21 composed of two portions 21' and 21" held together by bolts 22.

At the upper and lower end of cage 21 are bearings 23. On the rear face 14" of member 14, one below and one above opening 16 are bearing saddles 24 in which the bearings 23 seat, they being held in place by caps 25 secured by bolts 26 and nuts 26'. A spring 26" is placed around bolts 26 between nuts 26' and caps 25; this permits the cage to move away from member 14 in the event head 19 engages an object which blades 20 are unable to cut. Shaft 19' is mounted eccentrically to the axes of bearings 23, so that when the cage is partially rotated in one direction head 19 extends somewhat more within the opening 16 than when the cage is partially rotated in the opposite direction. The purpose of this construction is to adjust the position of the groover so that when member 14 moves in one direction it will be out of position to engage stock, and when moved in the opposite direction it will be in position to groove.

In order to move head 19 in or out of operating position automatically there is provided the following means. Projecting from cage 21 is a lug 27. Secured to member 4, is a support 28 which carries at its ends arms 29 and 30. In the upper ends of arms 29 and 30 are threaded stops 31 and 32 respectively. Viewing Figure 4—when member 14 travels to the right lug 27 engages stop 32 causing cage 21 to rotate sufficiently to move head 19 from opening 16. On the other hand when member 14 moves to the left, lug 27 engages stop 31 causing cage 21 to rotate on its bearing 23 in a direction opposite to that just described, thus causing head 19 to project into the opening 16. Concisely stated, member 19 is moved into opening 16 at one limit of the movement of member 14, and is moved out at the opposite limit of movement of member 14. By adjusting stops 30 and 31 the amount of in-and-out movement of head 19 can be regulated. The latter adjustment also provides for increasing or decreasing the depth of cut of grooving knives 20.

In operation member 14 moves back and forth. This is accomplished by means of a pitman 33 which has its one end connected to a pin 34 projecting from member 14, and its other end connected to crank 35 of shaft 36. It will be seen that as shaft 36 is rotated, member 14, through the medium of pin 34, pitman 33 and crank 35, will be moved back and forth on the supporting guideway.

In its operation head 19 is rotated, and for this purpose there is provided a motor 37 mounted on bracket 38 attached to member 14. The motor is provided with a driving pulley 39, and shaft 19' is provided with a driven pulley 40, driven by means of belt 41 trained about both pulleys.

Knife or cutter blade opening 15, as heretofore indicated, extends diagonally between top and bottom of member 14. In this opening is seated a blade 42, having its upper and lower ends resting upon ribs 43, which ribs are a part of and extend longitudinally of the member 14, and project from side 14' thereof. The cutting edge 44 is arranged to cut a strip from the stock block, the face of such stock being placed against face 14' of member 14, the blade then cuts a strip which includes such face. The means for holding the blade in shearing position and for its adjustment include the bars 45 and screws 46.

The stock utilized for producing separators is preferably in the form of blocks, the width and lengths of which are those of the same dimensions of a completed separator. In producing separators, this block is held with one of its faces against face 14' of member 14, the latter moves back and forth. As member 14 moves to the right, viewing Figure 4, head 19, which is rotating, cuts grooves in the opposing face of the block or stock, and blade 42 which follows the head 19, shears a strip from such stock or block. The thickness of such strip is that of a finished separator.

It is desirable to hold the block so that the grooving is accomplished parallel to or along the grain of the wood. Thereafter, it is desirable that the block be turned to a position wherein knife 42 shears at an angle to the grain.

Forming a part of the member 4 is an annular seat 47 having an offset portion 48 which provides a recess 49. Secured to the end of member 47 is ring 50, bolts 51 being employed to secure it in place. A stock support member 52 has one end 52' seated in member 47. However, between the two members is a sleeve bearing 53, fixed as to 52', which has a flange 53' stationed in recess 49. Between flange 53' and ring 50 is a suitable friction or thrust bearing assembly composed of balls 54 and raceways 55. Member 52 as will be seen consists of two sides 56 and a bottom portion 57. Member 52 is elongated, and the bottom 57 has an elongated slot 57', the purpose or function of which will be hereafter described.

A setting head 58 rides on the bottom 57 between sides 56. Beneath bottom 57, projecting therefrom, are arms 59 and 60. These arms are provided with bearings which carry the threaded setting rod 61. Rod 61 is not threaded with regard to arms 59 and 60 but is arranged to rotate freely therein. Head 58 has a boss 62 to which is secured the rod 63 by one of its ends. To the other end of this rod is a setting rod grip 64. The setting rod grip extends through slots 57 and its lower end is provided with a pivoted section 65 which is held in engagement with the lower end of setting rod grip 64 by shackle 66, the latter fits over the end of section 65. Members 64 and 65 have complementary grooves 64' and 65' respectively to receive rod 61. Groove 64' is not threaded and groove 65' is threaded. The object of this construction is to permit setting rod grip 64 to be moved back or forth irrespective of rod 61 when section 65 and its threaded groove 65' is in non-engaging position with respect to rod 61. In order to operate section 65 a rod 67 is attached thereto.

Ordinarily rotation of setting rod 61 moves head 58 toward member 14, provided section 65 is held in closed position. However, in order to move such head forward or backward irrespective of the setting rod, the foregoing mechanism has been provided. This may be termed the grip and grip release mechanism. In operation a block such as the block S, shown in Figures 6 and 7 is placed between head 58 and member 14. This block is of wood suitable for forming battery separators. The length of the block, along the grain of the wood, and the width transversely to the grain, correspond to the length and width of a completed separator. In viewing Figure 6, the width of the block is in a vertical direction, the length is not revealed in this figure but is in Figure 7; it is the distance between the upper and lower edges of the block. While the thickness of the block is the distance between head 58 and member 14, this is the same in both views.

Mounted to the outer end of rod 61 is a hand crank 68, also a ratchet 69 which is engaged by a pawl 70 pivoted to member 59. The ratchet and pawl prevent reverse rotation or back lash of rod 61, while the crank provides manual means for operating rod 61. Rod 61 acts to constantly advance head 58 and consequently block S toward member 14, so that as one separator is sliced or sheared from the block such block is advanced to the position wherein another may be sheared therefrom. This is continually repeated as the blade and grooving head move back and forth as heretofore explained. In order to move the block or more properly to operate rod 61 for that purpose, means associated with the reciprocation of member 14 are provided so that the operation of rod 61 will be in time with the movement of member 14.

This means includes a sleeve 71 secured to rod 61. Forwardly of sleeve 71 is an arm or lever 72 carried upon rod 61 but not rigid with or attached thereto so that it may be rocked with respect to such rod. Forward of arm 72 is rachet wheel 73 also free on such rod. Ratchet 73 is associated with clutch member 74, the latter being secured to or on rod 61. Clutch 74 and ratchet 73 are connected by a cone clutch arrangement so that as the ratchet is turned the clutch causes it to turn rod 61. However when block S engages member 14, it naturally becomes increasingly difficult to turn rod 61, whereupon the clutch and rod remain stationary permitting the ratchet to turn with regard to the rod and clutch. Ratchet 73 is engaged by pawl 75 carried by arm 72 through the medium of pin 76, the pawl being held in engagement with the ratchet by the spring 77 coiled about such pin. Pivotally mounted to the lower end of arm 72 is one end of link 78 which extends loosely through bracket 79 carried by member 14. Secured to link 78 are two stops, one 80 secured one side of the bracket, and the other 81 positioned on the opposite side thereof. A spacing is provided between the two stops upon which the bracket travels when member 14 is being operated. However in its travel the bracket engages both stops, and when it does so it moves them and the link to which they are attached and consequently moves arm or lever 72. Viewing Figure 1, when the bracket engages stop 81 it moves lever 72 to the right, causing pawl 75 to operate ratchet 73, revolving rod 61 and consequently moving setting block 58 and stock S to position wherein blade 42 shears a separator from such stock. Each time member 14 moves to the right (Figure 1) the lever 72 is operated, likewise ratchet 73, thus moving stock S forward to engage member 14 where it is in a position wherein a separator may be formed as member 14 moves in the opposite direction.

It has been previously stated that in shearing separators from stock S, the block is first positioned to allow groover 19 to cut grooves in the face thereof along or parallel the grain of the wood, and then the block is turned or rotated in order that blade 42 may shear across the grain, with the cutting edge of the blade more or less parallel to such grain as distinguished from a stroke which may sever the grain. It will be seen that the block is first held in one position for the stroke of the grooving apparatus, and turned for the operation of the shearing apparatus. The proper positioning of stock is accomplished by rocking stock support member 52 first in one direction and then in the opposite, to attain the desired position for stock S. As before described member 52 is seated in annular seat 47 wherein it may rotate to a limited extent, in this connection Figure 1 showing it having been rocked to the right. In order to rock the stock support, sleeve 53 is provided with a downwardly directed arm 82 which operates in an arcuate slot 83 in seat 47. To this arm is pivotally attached equalizer 84, which has its intermediate portion secured to such arm. Connecting with each end of the equalizer is a link 85, the connections being pivotal. Pivotally mounted to the base brackets 86 and 87 are the bell cranks 88 and 89. These cranks are mounted as aforesaid at their elbows, and are provided with arms 88', 88'', and 89', 89'' respectively. Arms 88' and 89' are each pivotally connected to a link 85. To the ends of arms 88'' and 89'' are rotatively mounted the rolls 90 and 91 respectively. At one end of member 14 (the left in Figure 1), and secured by pin 92 to guide 18, is a trip member 93, and at the opposite end of member 14, and to guide 18, trip 94 is secured by means of pin 95. The pin mounting permits the trips to pivot somewhat as will presently appear.

Trip 93 has a trip face 93' and a cam face 93'', and trip 94 is likewise provided with a trip face 94' and a cam face 94''. Each of the trips are provided with stops 96 which engage the top of guides 18 of member 14. The line of movement of member 14 causes the trips 93 and 94 to engage rolls 90 and 91 respectively. Viewing Figure 1, when member 14 moves to the left the cam face 93'' engages roll 90, as it does so, stop 96 engages the top of guide 18 holding trip 93 stationary thus causing roll 90 to travel to the bottom of the cam face and rocking crank 88, pulling link 85 connected thereto to the left and rocking the stock holding member 52 to the right, to a position where blade 42 shears at an angle to the grain of the stock, and in completion of the movement, trip 93 passes beyond 90. When member 14 moves to the right the trip face 93' engages roll 90 and the trip is rocked out of the way, at the same time cam face 94" of trip 94 engages roll 91, the trip is held stationary by the stop 96 engaging top of guide 18, roll 91 travels down the cam 94" thus rocking crank 89 and pulling the connected link 85 to the right, together with member 84 and arm 82, thereby rocking the stock support member 52 to an upright position for groover 19 to groove the stock along its grain. When member 14 travels to the left trip 94 raises out of engagement when face 94' engages roll 91. As member 14 moves to the right stock support member 52 is rocked to the left, and during the movement of member 14 to the left stock support member 52 is rocked to the right. In the first position the grain of the stock is approximately horizontal, while in the latter position the grain approximates the vertical. The grain of the stock is in a vertical position as member 14 moves to the right, but the stock is not engaged by groover 19 for the reason that it has been moved out of engaging position by reason of lug 27 having engaged stop 32. However upon the member 14 reaching the end of its movement to the right the member 27 engages stop 31 which moves the groover into operating position. Thereafter as member 14 moves to the left the groover cuts grooves in the face of the stock. Immediately upon passing of the groover, the stock support member is rocked to the right wherein the grain of the stock approaches a vertical position to enable blade 42 to shear a separator therefrom.

In order to ensure that the separators sheared from stock S have a proper width, lateral cutters 20' and 20" are provided in shearing blade 20. The spacing between these cutters is that of the width of a separator desired, and in the event that the stock exceeds this width these cutters will remove the excess material.

Figure 12:
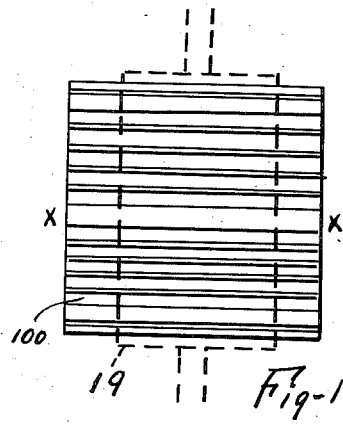
Figures 12 and 13 are diagrammatic in character. These illustrate the two principal operations performed in manufacturing separators by means of the herein described machine.
Figure 13:
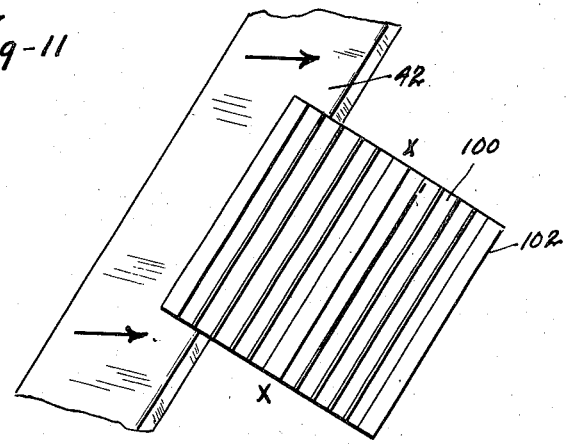
Figure 10:
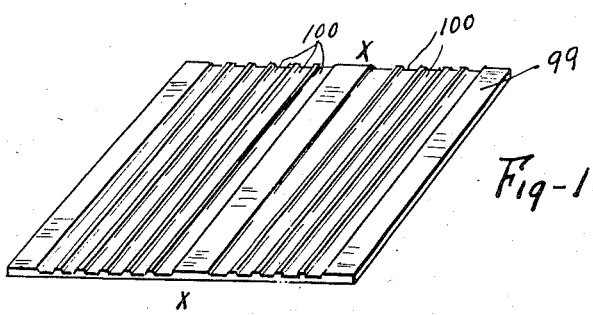
Figure 10 is a perspective of a completed separator.

The following concerns itself with separators and stock. Figure 10 illustrates a completed separator 99 provided with grooves cut in one face thereof. These grooves have been cut by the groover heretofore described. These grooves are indicated by the number 100. This separator consists of a strip, sheet or thin board sheared from face 101 of the block, heretofore referred to as stock. This block is indicated by the number 102. The grain of the wood which composes the stock extends from X to X. The letters X indicate the direction of the grain throughout the four last figures. Figure 12 shows how the head 19 grooves with the grain of the block, while in Figure 13 blade 42 is shown shearing at an angle to the grain.

I claim:—

1. In combination, a reciprocating member, a grooving device and a shearing device mounted upon said member, a stock holding member including construction intermittently advancing the stock to a position to be attacked by the grooving and shearing devices, and mechanism actuated by the reciprocating member operable to alter the position of the stock holding member so that the grooving device may attack the stock along the grain and the shearing device attack it laterally of the grain.

2. In combination a slide or guideway, a reciprocating member carried thereby, a grooving device and a shearing device mounted upon said member, a stock holding member including construction intermittently advancing stock held thereby to a position to be attacked by the grooving and shearing devices, and mechanism actuated by the reciprocating member operable to alter the position of the stock holding member so that the grooving device may operate longitudinally of the stock, and the shearing device operate transversely of the stock.

3. In combination, a reciprocating member, a holder for supporting a block of wood in proximity to such member, a grooving head support movably mounted to the member, a rotary grooving head carried thereby, contacts positioned to engage the grooving head support member at the termination of each movement of the reciprocating member, one of said contacts moving the grooving head support in one direction, and the other moving it in the opposite direction, said support when moved in one direction moving the grooving head into position to groove a face of the block, and when moved in the opposite direction moving the grooving head out of position to groove the face of the block, a blade carried by the reciprocating member adapted to shear a strip from the block which strip includes a face grooved by the grooving head, and mechanism for advancing the block toward the reciprocating member after a strip has been sheared therefrom.

4. In combination, a reciprocating member, a holder for supporting a block of wood in proximity to such member, a groover movably mounted to the reciprocating member, contacts positioned to engage the groover at the termination of each movement of the reciprocating member, one of the contacts moving the groover in one direction and the other moving it in the opposite direction, said groover when moved in one direction being in position to groove a face of the block and when moved in the opposite direction being out of position to groove the face of the block, a blade carried by the reciprocating member adapted to shear a strip from the block which strip includes a face grooved by the groover, and mechanism for advancing the block toward the reciprocating member after a strip has been sheared therefrom.

5. In combination, a reciprocating member, a means for supporting a block of wood in proximity to such member, a groover movably mounted to the reciprocating member, said groover when moved in one direction being in position to groove a face of a block held by the holder, and when moved in the opposite direction being out of position to groove the face of the block, a member contacting and moving the groover into grooving position at the termination of the one movement of the reciprocating member, a second member contacting and moving the groover out of grooving position at the termination of the alternate movement of the reciprocating member, a shearing knife or blade carried by the reciprocating member adapted to shear or slice a strip from the block during the one movement of the reciprocating member and subsequent to the grooving operation, said strip so sheared including the previously grooved face, construction permitting the block supporting means to be turned to permit the face of the block to be grooved along or continuous with the grain and the shearing to be performed transversely of the grain, and mechanism connected with the block supporting means actuated by the reciprocating member operable to turn such block supporting means first in one direction and then in the opposite.

6. In combination, a reciprocating member, grooving and shearing means carried by such member respectively operating to groove a face of a piece or block of wood held in contact with the reciprocating member and to shear a strip or piece from such block which piece includes the grooved face, a support member for supporting a block in the aforesaid position, construction permitting the support to be turned to allow the grooving to be performed along or parallel the grain of the block and the shearing to be performed transversely of the grain, and mechanism connected to the support and actuated by the reciprocating member operable to turn the support as aforesaid.

7. In combination, a reciprocating member, grooving and shearing means carried by such member respectively operating to groove a face of a piece or block of wood held in contact with the reciprocating member and to shear a strip or piece from such block which piece shall include the grooved face, a support member for supporting a block in the aforesaid position including a seat carrying said support member constructed to allow it to be partially rotated in one direction and then in the opposite direction in order that the grooving may be performed along or parallel the grain of the block and the shearing to be performed transversely of the grain, and mechanism connected to the support and actuated by the reciprocating member operable to rotate the support as aforesaid.

8. In combination, a reciprocating member, grooving and shearing means carried by such member respectively operating to groove a face of a piece or block of wood held in contact with the reciprocating member and to shear a strip or piece from such block which piece shall include the grooved face, a support member for supporting a block in the aforesaid position including a seat carrying said support member constructed to allow it to be partially rotated in one direction and then in the opposite direction in order that the grooving may be performed along or parallel the grain of the block and the shearing to be performed transversely of the grain, means to so rotate the support including a lever connected to the support member, bell cranks operatively connected to the lever, and tripping devices carried by the reciprocating member for actuating the bell cranks, one of said tripping devices operating one of the bell cranks as the reciprocating member travels in one direction and the other tripping device operating the other bell crank as the reciprocating member travels in the opposite direction.

9. The invention as set forth including a block holding or supporting member within which a block to be transformed into separators is placed, mechanism for intermittently advancing the block including a head bearing against the block, a propelling screw providing for such advancement including a releasable connection between screw and head; a lever, a ratchet wheel operated thereby, a clutch mechanism connecting the ratchet wheel to the propelling screw, a reciprocating member, a connection between the reciprocating member and lever whereby the lever is intermittently operated, a grooving device and a shearing blade carried by the reciprocating member, said reciprocating member moving in a path intersecting the advancing block whereby the grooving device grooves an exposed face of the block and the blade shears a strip from the block which strip includes the face grooved by the grooving device.

10. The invention as set forth including a block holding or supporting member within which a block to be transformed into separators is placed, mechanism for intermittently advancing the block including a head bearing against the block, a rotary screw, a connection between screw and head whereby as the screw is rotated the head advances including construction providing for a release in the connection to allow the head to advance or retire independently thereof, a ratchet having a connection permitting it to rotate the screw, a lever or arm associated with the screw provided with means for operating the ratchet, a reciprocating member, a connection between reciprocating member and lever whereby the lever is intermittently compelled to operate the ratchet, a grooving device and a shearing blade carried by the reciprocating member, said reciprocating member moving in a path intersecting the advancing block whereby the grooving device grooves an exposed face of the block and the blade shears a strip from the block which strip includes the face grooved by the grooving device.

11. In a machine for manufacturing wood battery separators from the end of a block, grooving means and shearing means and means for presenting the block to the grooving means for grooving the same lengthwise of the grain and means for subsequently turning the block with relation to the shearing means for shearing off a separator diagonally of the grain.

WALLACE G. TOWER.